United States Patent
Moshfeghi

(10) Patent No.: US 9,812,905 B2
(45) Date of Patent: *Nov. 7, 2017

(54) METHOD AND SYSTEM FOR WIRELESS BATTERY CHARGING UTILIZING ULTRASONIC TRANSDUCER ARRAY BASED BEAMFORMING

(71) Applicant: Golba LLC, Rancho Palos Verdes, CA (US)

(72) Inventor: Mehran Moshfeghi, Rancho Palos Verdes, CA (US)

(73) Assignee: GOLBA LLC, Ranchose Palos Verdes, AS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/997,809

(22) Filed: Jan. 18, 2016

(65) Prior Publication Data

US 2016/0211705 A1    Jul. 21, 2016

Related U.S. Application Data

(63) Continuation of application No. 13/421,476, filed on Mar. 15, 2012, now Pat. No. 9,246,349.

(51) Int. Cl.
*H02J 7/00*    (2006.01)
*H02J 50/15*    (2016.01)
(Continued)

(52) U.S. Cl.
CPC .............. *H02J 50/15* (2016.02); *H02J 7/025* (2013.01); *H04B 5/0037* (2013.01);
(Continued)

(58) Field of Classification Search
CPC ................................ H02J 7/025; H02J 50/115
(Continued)

(56) References Cited

U.S. PATENT DOCUMENTS 5,999,124 A   12/1999  Sheynblat
6,131,067 A   10/2000  Girerd et al.
(Continued)

FOREIGN PATENT DOCUMENTS

WO    WO 2005/091997    10/2005

OTHER PUBLICATIONS

Portions of prosecution history of U.S. Appl. No. 12/979,254, Mar. 3, 2014, Moshfeghi, Mehran.
(Continued)

*Primary Examiner* — Drew A Dunn
*Assistant Examiner* — Zixuan Zhou
(74) *Attorney, Agent, or Firm* — Adeli LLP

(57) ABSTRACT

An ultrasound power transmitter comprising a transmit ultrasonic transducer array has a plurality of transmit ultrasonic transducers. The ultrasound power transmitter activates a set of transmit ultrasonic transducers in close proximity of an electronic device to be arranged to beam ultrasound energy to the electronic device. Alignment magnets of the ultrasound power transmitter are aligned with corresponding alignment magnets of the electronic device to manage the ultrasound beaming. The ultrasound energy may be converted into electric power to charge the battery of the electronic device. Feedbacks may be provided by the electronic device to the ultrasound power transmitter to increase power transmission efficiency. The ultrasound power transmitter may pair the electronic device with other different electronic devices utilizing ultrasonic signals. A spacer with good ultrasound power transmission properties may be located between the ultrasound power transmitter and an ultrasound power receiver of an intended electronic device to enhance power transmission.

22 Claims, 8 Drawing Sheets

(51) Int. Cl.
 H02J 7/02 (2016.01)
 H04B 11/00 (2006.01)
 H04B 7/06 (2006.01)
 H04B 5/00 (2006.01)

(52) U.S. Cl.
 CPC ........... *H04B 7/0617* (2013.01); *H04B 11/00* (2013.01); *H02J 2007/0096* (2013.01); *H04B 5/0031* (2013.01)

(58) Field of Classification Search
 USPC .................... 29/594; 320/107–108; 307/104; 455/151.2; 340/825.72, 5.64, 13.22
 See application file for complete search history.

(56) References Cited

U.S. PATENT DOCUMENTS

| | | | |
|---|---|---|---|
| 6,169,339 B1 | 1/2001 | Cripe | |
| 6,185,427 B1 | 2/2001 | Krasner et al. | |
| 6,215,441 B1 | 4/2001 | Moeglein et al. | |
| 6,671,520 B1 | 12/2003 | Kim | |
| 6,798,716 B1* | 9/2004 | Charych | H02J 17/00 367/119 |
| 6,920,330 B2 | 7/2005 | Caronni et al. | |
| 6,972,543 B1 | 12/2005 | Wells | |
| 7,400,253 B2 | 7/2008 | Cohen | |
| 7,521,890 B2 | 4/2009 | Lee et al. | |
| 7,558,564 B2 | 7/2009 | Wesby | |
| 7,610,092 B2 | 10/2009 | Cowan et al. | |
| 7,741,970 B2 | 6/2010 | Cunningham et al. | |
| 8,686,685 B2 | 4/2014 | Moshfeghi | |
| 9,077,188 B2 | 7/2015 | Moshfeghi | |
| 9,246,349 B2 | 1/2016 | Moshfeghi | |
| 9,407,111 B2 | 8/2016 | Moshfeghi et al. | |
| 9,608,472 B2 | 3/2017 | Moshfeghi | |
| 2004/0095241 A1 | 5/2004 | Maloney | |
| 2004/0217865 A1 | 11/2004 | Turner | |
| 2005/0030160 A1 | 2/2005 | Goren et al. | |
| 2005/0088284 A1 | 4/2005 | Zai et al. | |
| 2005/0104790 A1 | 5/2005 | Duron | |
| 2005/0198228 A1 | 9/2005 | Bajwa | |
| 2005/0242188 A1 | 11/2005 | Vesuna | |
| 2006/0022802 A1 | 2/2006 | Bridgelall | |
| 2006/0068750 A1 | 3/2006 | Burr | |
| 2006/0083257 A1 | 4/2006 | Price et al. | |
| 2006/0113955 A1 | 6/2006 | Nunally | |
| 2006/0130046 A1 | 6/2006 | O'Neill | |
| 2006/0287740 A1 | 12/2006 | Ertel | |
| 2007/0243851 A1 | 10/2007 | Shoarinejad et al. | |
| 2008/0100423 A1 | 5/2008 | Geissler et al. | |
| 2008/0100435 A1 | 5/2008 | Jorgenson et al. | |
| 2008/0111661 A1 | 5/2008 | Lin et al. | |
| 2008/0150364 A1 | 6/2008 | Chen et al. | |
| 2008/0191845 A1 | 8/2008 | Strzelczyk | |
| 2008/0197804 A1 | 8/2008 | Onishi et al. | |
| 2008/0231449 A1 | 9/2008 | Moshfeghi | |
| 2009/0058361 A1 | 3/2009 | John | |
| 2009/0207013 A1 | 8/2009 | Ayed | |
| 2009/0309704 A1 | 12/2009 | Chang et al. | |
| 2010/0027379 A1 | 2/2010 | Saulnier et al. | |
| 2010/0156610 A1 | 6/2010 | Wild et al. | |
| 2010/0181961 A1 | 7/2010 | Novak et al. | |
| 2010/0201513 A1 | 8/2010 | Vorenkamp et al. | |
| 2010/0259213 A1 | 10/2010 | Maharaj | |
| 2010/0295663 A1 | 11/2010 | Shoarinejad et al. | |
| 2010/0297946 A1 | 11/2010 | Alameh et al. | |
| 2011/0050164 A1* | 3/2011 | Partovi | H01F 5/003 320/108 |
| 2011/0057612 A1 | 3/2011 | Taguchi et al. | |
| 2011/0077513 A1 | 3/2011 | Rofougaran | |
| 2011/0077714 A1 | 3/2011 | Rofougaran | |
| 2011/0258467 A1 | 10/2011 | Antoci | |
| 2012/0086394 A1* | 4/2012 | Hui | H01F 38/14 320/108 |
| 2012/0235636 A1 | 9/2012 | Partovi | |
| 2013/0091238 A1* | 4/2013 | Liu | H04W 76/02 709/217 |
| 2016/0322833 A1 | 11/2016 | Moshfeghi et al. | |
| 2016/0380471 A1 | 12/2016 | Moshfeghi | |
| 2016/0380472 A1 | 12/2016 | Moshfeghi | |
| 2017/0077742 A1 | 3/2017 | Moshfeghi | |

OTHER PUBLICATIONS

Portions of prosecution history of U.S. Appl. No. 14/223,841, Feb. 17, 2017, Moshfeghi, Mehran.
Portions of prosecution history of U.S. Appl. No. 13/421,500, Jun. 3, 2015, Moshfeghi, Mehran.
Portions of prosecution history of U.S. Appl. No. 13/421,476, Dec. 30, 2015, Moshfeghi, Mehran.
Portions of prosecution history of U.S. Appl. No. 14/791,742, Apr. 20, 2016, Moshfeghi, Sina, et al.
Portions of prosecution history of U.S. Appl. No. 15/208,493, Mar. 16, 2017, Moshfeghi, Sina, et al.
Portions of prosecution history of U.S. Appl. No. 15/263,629, Apr. 25, 2017, Moshfeghi, Mehran.
Portions of prosecution history of U.S. Appl. No. 15/263,755, Sep. 13, 2016, Moshfeghi, Mehran.
Portions of prosecution history of U.S. Appl. No. 15/361,665, Apr. 25, 2017, Moshfeghi, Mehran.
Author Unknown, "Cisco Application-Oriented Networking Facilitates Intelligent Radio Frequency Identification Processing at the Edge," Month Unknown 2005, 9 pages, Cisco Systems, Inc., United States.
Author Unknown, "ConnecTerra Product Family", Month Unknown 2005, 2 pages, www.connecterra.com, Cambridge, USA.
Author Unknown, "ConnecTerra: Four Challenges", Month Unknown 2004, 7 pages, ConnecTerra, Inc.
Author Unknown, "Delivering an Intelligent Foundation for RFID: Maximizing Network Efficiency with Cisco RFID Solutions," Solution Overview, Month Unknown 2005, 6 pages, Cisco Systems, Inc.
Author Unknown, "Energy Harvesting with Piezo Patch Transducers," Moving the NanoWorld, Jul. 10, 2010, 13 pages, www.piceramic.de.
Author Unknown, "Installation Manual R500HA Long Range RFID Reader," www.iautomate.com, May 2, 2005, 40 pages.
Author Unknown, "RFTag Aware™ Enterprise Server: Centralized EPC Data Management and Reporting for Enterprise-Scale RFID Deployments," www.connecterra.com, Month Unknown 2005, 2 pages, ConnecTerra, Inc., Cambridge, MA.
Author Unknown, "RFTagAware™: Establishing the Foundation for Enterprise-Scale RFID Deployments", www.connecterra.com/products/rftagaware.php, Sep. 2005, 2 pages.
Author Unknown, "The Sun Global RFID Network Vision: Connecting Businesses at the Edge of the Network," A Technical White Paper, Jul. 2004, 20 pages, Sun Microsystems, Inc., Santa Clara, CA.
Clark, Sean, et al., "Auto-ID Savant Specification 1.0," Sep. 1, 2003, 58 pages, Auto-ID Center®.
Miller, Leonard E., "Why UWB? A Review of Ultrawideband Technology," National Institute of Standards and Technology, DARPA, Apr. 2003, 78 pages, Gaithersburg, Maryland.
Miller, Leonard E., "Wireless Technologies and the SAFECOM SoR for Public Safety Communications", National Institute of Standards and Technology, Month Unknown 2005, 76 pages, Gaithersburg, Maryland.
Reynolds, Matthew, et al., "Design Considerations for Embedded Software-Defined RFID Readers", Emerging Wireless Technology/A Supplement to RF Design, Aug. 2005, 2 pages, www.rfdesign.com.
Smulders, P.F.M., "60 GHz radio: prospects and future directions," Proceedings Symposium IEEE Benelux Chapter on Communications and Vehicular Technology, Month Unknown, 2003, pp. 1-8, Eindhoven, The Netherlands.
Sodano, Henry A., et al., "A Review of Power Harvesting from Vibration using Piezoelectric Materials," The Shock and Vibration Digest, May 2004, 9 pages, vol. 36, No. 3, Sage Publications.

(56) References Cited

OTHER PUBLICATIONS

Wells, Jonathan, "Multigigabit wireless technology at 70 GHz, 80 GHz and 90 GHz," May 2006, 5 pages.

* cited by examiner

METHOD AND SYSTEM FOR WIRELESS BATTERY CHARGING UTILIZING ULTRASONIC TRANSDUCER ARRAY BASED BEAMFORMING

CLAIM OF BENEFIT TO PRIOR APPLICATIONS

This patent application is a continuation application of U.S. patent application Ser. No. 13/421,476, filed Mar. 15, 2012, now published as U.S. Patent Publication 2013/0241468. U.S. patent application Ser. No. 13/421,476, now published as U.S. Patent Publication 2013/0241468 is incorporated herein by reference.

CROSS-REFERENCE TO RELATED APPLICATIONS/INCORPORATION BY REFERENCE

This application makes reference to U.S. application Ser. No. 12/979,254 filed on Dec. 27, 2010, now patented as U.S. Pat. No. 8,686,685.

The above stated application is hereby incorporated herein by reference in its entirety.

FIELD OF THE INVENTION

Certain embodiments of the invention relate to signal processing for communication systems. More specifically, certain embodiments of the invention relate to a method and system for wireless battery charging utilizing ultrasonic transducer array based beamforming.

BACKGROUND OF THE INVENTION

Portable devices such as mobile phones, laptop computers, tablets, and other communication devices often rely on electrical battery energy to conduct communications. Electrical batteries store chemical energy and deliver electrical energy through an electrochemical conversion process. An electrical battery consists of one or more cells, organized in an array. Each cell consists of an anode, a cathode, and an electrolyte that separates the two electrodes and allows the transfer of electrons as ions between them. Chemical material that originates chemical reactions within the cell is called active material. In practice, the energy that can be obtained from a cell is fundamentally limited by the quantity of active material contained in the cell. Electrical batteries may be non-rechargeable or rechargeable. Although some portable devices may use non-rechargeable batteries, the vast majority depend on rechargeable batteries. Portable devices run on batteries. Display, hard disk, logic, and memory are the device components with the greatest impact on power consumption; however, when a wireless interface is added to a portable system, power consumption increases significantly. For example, even when not making a call, mobile phones keep listening to the network over wireless interfaces to keep in touch with the network in case a call comes in. Batteries with features such as a long lifetime, a lightweight, and a small size are highly desirable in portable wireless devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for wireless battery charging utilizing ultrasonic transducer array based beamforming, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for wireless battery charging utilizing ultrasonic transducer array based beamforming. In accordance with various exemplary embodiments of the invention, an ultrasound power transmitter comprising a transmit (Tx) ultrasonic transducer array has a plurality of Tx ultrasonic transducers. The ultrasound power transmitter may activate a set of Tx ultrasonic transducers in close proximity to an ultrasound power receiver of an electronic device. The activated set of Tx ultrasonic transducers may be arranged to beam ultrasound energy to the ultrasound power receiver of the electronic device. The ultrasound beaming may be managed by aligning alignment magnets of the ultrasound power transmitter with alignment magnets of the ultrasound power receiver. The ultrasound energy may be converted into electric power to charge the battery of the electronic device. A feedback regard to the ultrasound beaming may be provided by the electronic device to the ultrasound power transmitter to increase power transmission efficiency. The ultrasound power transmitter may activate a set of transmit ultrasonic transducers of the Tx ultrasonic transducer array in close proximity of a specific geographic area with good ultrasound transmission, permeability, and/or magnetic property. The activated set of transmit ultrasonic transducers may be utilized to beam ultrasound energy to the specific geographic area. The electronic device may be moved or sent into the specific geographic area for ultrasound battery charging. The ultrasound power transmitter may pair the electronic device with other electronic devices utilizing ultrasonic signals. In this regard, device pairing information such as device identity identifiers and/or communication protocols may be embedded into the ultrasonic signals. The ultrasound power transmitter may emit the resulting ultrasonic signals to the electronic devices utilizing different sets of Tx ultrasonic transducers activated based on corresponding proximity of the electronic devices. A spacer with good ultrasound power transmission properties may be located or placed between the ultrasound power transmitter and an intended electronic device to enhance power transmission.

Figure 1:
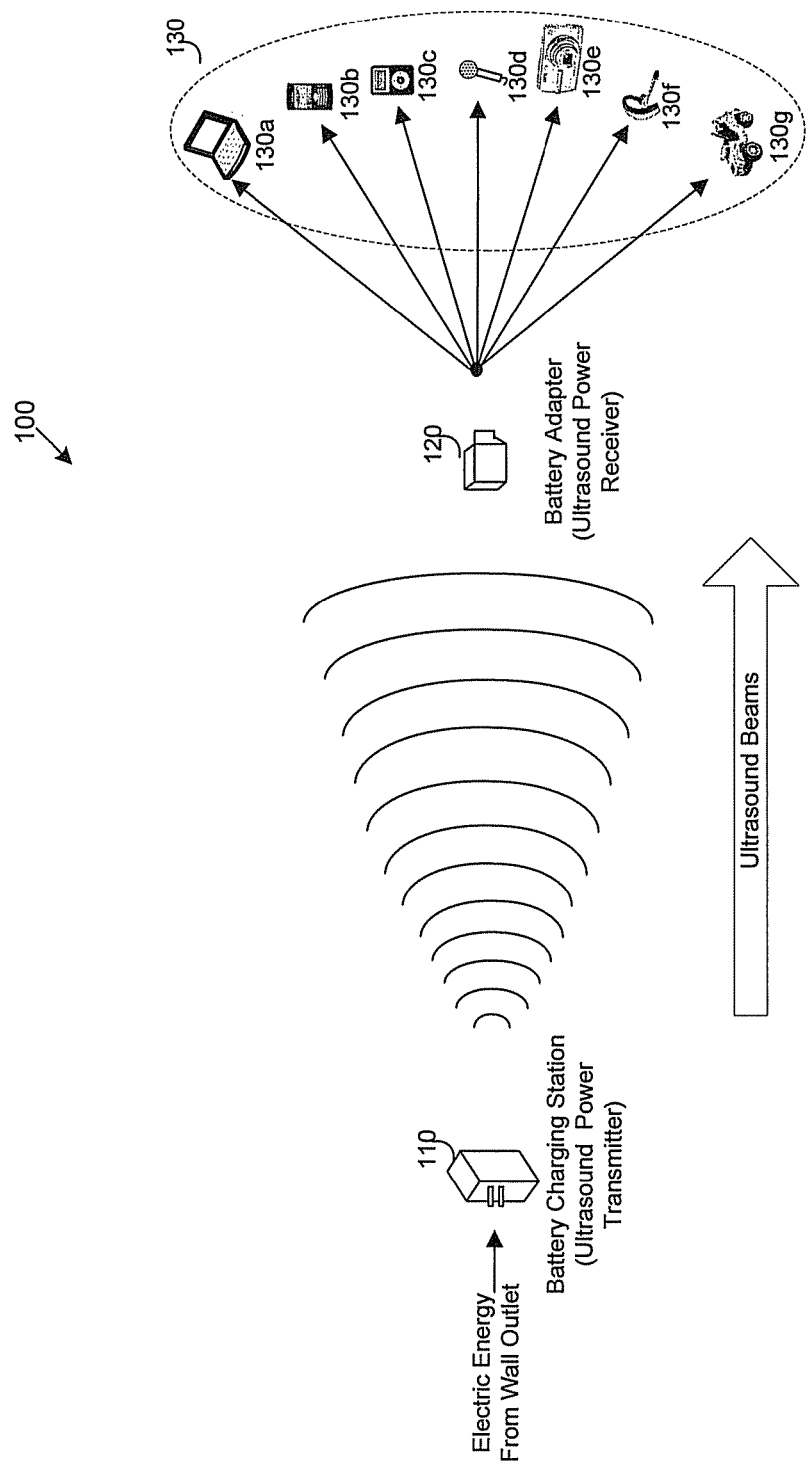
FIG. 1 is a diagram illustrating an exemplary communication system that is operable to wirelessly charge electrical batteries utilizing ultrasound, in accordance with an embodiment of the invention.

FIG. 1 is a diagram illustrating an exemplary communication system that is operable to wirelessly charge electrical batteries utilizing ultrasound, in accordance with an embodiment of the invention. Referring to FIG. 1, there is shown a communication system 100. The communication system 100 comprises a battery charging station 110, a battery adapter 120 and a plurality of electronic devices 130, of which electronic devices 130a through 130g are illustrated.

The battery charging station 110 may comprise suitable logic, circuitry, interfaces and/or code that are operable to produce emissions in the ultrasonic range. In this regard, the battery charging station 110 may be operable to convert electric power from electrical sources such as an electrical wall outlet into inaudible ultrasound energy. In an embodiment of the invention, the battery charging station 110 may be operable to emit or transmit the ultrasound energy to intended objects such as the electronic devices 130a-130g so as to wirelessly charge electrical batteries utilized by the electronic devices 130a-130g.

The battery charging station 110 may be operable to select which electronic device to power up and communicate with. The electronic devices 130a-130g may be identified through various device identification information such as media access control address (MAC ID), network IP address, name, serial number, product name and manufacturer, and/or capabilities. The battery charging station 110 may acquire the device IDs from the electronic devices 130a-130g so as to prioritize charging. In an exemplary embodiment of the invention, an electronic device may function as a battery charging station. For example, in some instances, an electronic device may comprise power receivers and power transmitters. The battery charging station 110 may charge such an electronic device and the electronic device may then charge another electronic device that needs to be charged. The battery charging station 110 may comprise a credit card reader so that users of the electronic devices 130a-130g may not only charge their devices but also make payment transactions. For example, phones with near field communication (NFC) capabilities may not only be charged but they may also be used for contactless payment. In this regard, the users may place the phones near the battery charging station 110 in order to transmit payment information to a secured server on the Internet. Alternatively, the battery charging station 110 may receive credit card information through chips embedded in the credit cards, for example. The battery charging station 110 may be built-in to conference room tables, office tables or lightweight pads so that meeting participants may wirelessly charge their devices, connect to each other or to the Intranet/Internet, transmit/receive information, and/or make payment transactions.

The battery adapter 120 may comprise suitable logic, circuitry, interfaces and/or code that are operable to sense or detect ultrasonic signals emitted from the battery charging station 110. The battery adapter 120 may be operable to convert ultrasound energy corresponding to the received ultrasonic signals back into electrical power to charge electrical batteries of the electronic devices 130a-130g.

The electronic devices 130a through 130g may comprise suitable logic, circuitry, interfaces and/or code that are operable to utilize electrical battery energy to conduct communications for desired services. The electronic devices 130a-130g may be wirelessly charged without using cables or AC adapters. In this regard, batteries of the electronic devices 130a-130g may be wirelessly charged utilizing ultrasound energy emitted from the battery charging station 110.

Although a single stand-alone battery adapter is illustrated in FIG. 1 for wirelessly charge electrical batteries utilizing ultrasound, the invention may not be so limited. Accordingly, each electronic devices may have its own battery adapter, or the battery charging station may have multiple battery adapters utilized to wirelessly charge one or more electronic devices without departing from the spirit and scope of various embodiments of the invention.

In an exemplary operation, the battery charging station 110 may receive or capture electric power and convert the electric power into inaudible ultrasound energy. The battery charging station 110 may be operable to beam the ultrasound energy to the battery adapter 120. The battery adapter 120 may sense or receive the ultrasound energy wirelessly emitted from the battery charging station 110. The battery adapter 120 may convert the received ultrasound energy back into electric power. The battery adapter 120 may utilize the electric power to charge batteries of the electronic devices 130a-130g.

Figure 2:
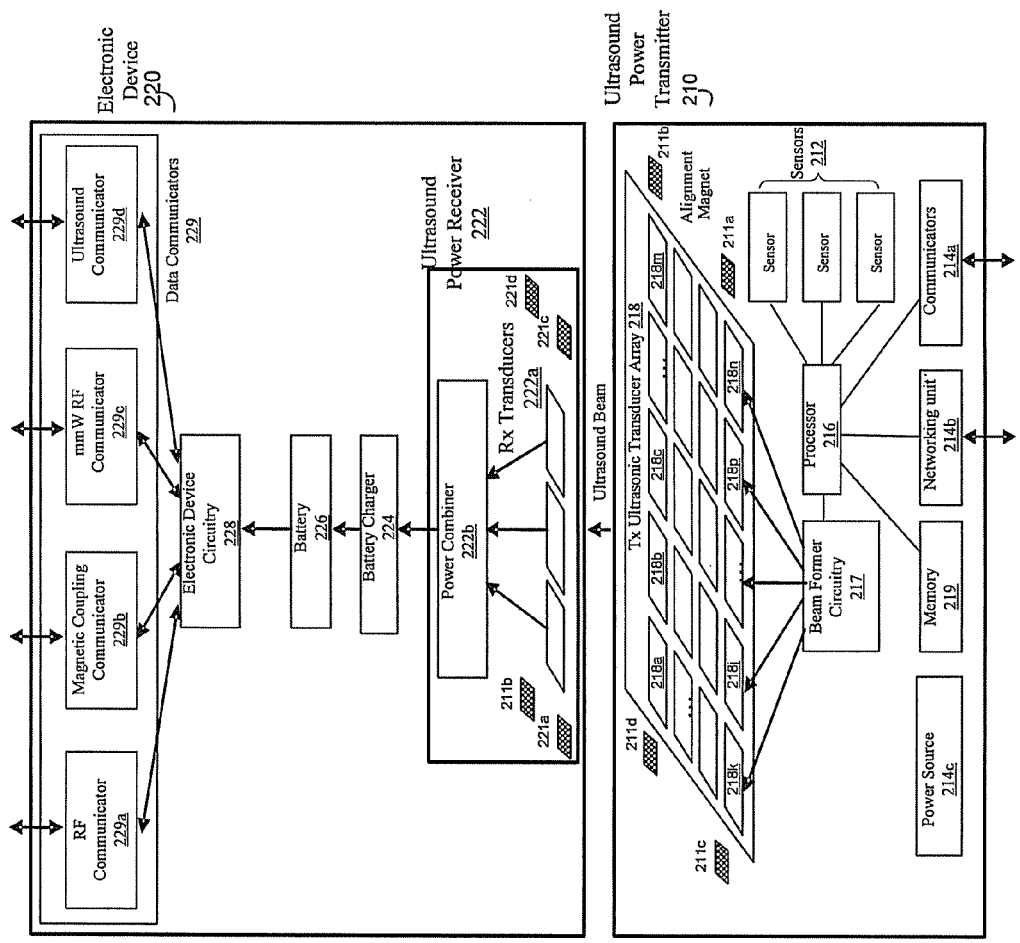
FIG. 2 is a diagram illustrating an exemplary scenario for wireless ultrasound battery charging utilizing ultrasonic transducer array based beamforming, in accordance with an embodiment of the invention.

FIG. 2 is a diagram illustrating an exemplary scenario for wireless ultrasound battery charging utilizing ultrasonic transducer array based beamforming, in accordance with an embodiment of the invention. Referring to FIG. 2, there is shown an ultrasound power transmitter 210 and an electronic device 220.

The ultrasound power transmitter 210 may comprise suitable logic, circuitry, interfaces and/or code that are operable to convert electric power into inaudible ultrasound energy. The ultrasound power transmitter 210 comprises a plurality of sensors 212, communicators 214a, a networking unit 214b, a power source 214c, a processor 216, a beam former circuitry 217, a ultrasonic transducer array 218, and a memory 219.

The sensors 212 may comprise suitable logic, circuitry, interfaces and/or code that are operable to sense power or signals. The sensors 212 may capture and receive sensed signals and communicate with the processor 216 so that the processor 216 may use that information for optimal charging or may transmit the sensed signals over the communicators 214a and/or the networking unit 214b, for example. In an exemplary embodiment of the invention, the sensors 212 may sense the location of the battery adapter 120 of an electronic device such as the electronic device 130a. The sensors 212 may provide that location information to the processor 216 so that an optimal subset of transducer elements of the ultrasonic transducer array 218, for example, those transducer elements that are close to the receive transducers 222a, may be activated.

The communicators 214a may comprise suitable logic, circuitry, interfaces and/or code that are operable to communicate signals at appropriate frequency bands such as a radio frequency band. In this regard, the communicators 214a may be operable to capture and receive electric power by communicating radio frequency (RF) signals, mm-wave (mmW) signals, and/or ultrasonic signals with appropriate networks.

The networking unit 214b may comprise suitable logic, circuitry, interfaces and/or code that are operable to communicate ultrasound power with electronic devices to propagate the ultrasound power for wirelessly battery charging.

The power source 214c may comprise suitable logic, circuitry, interfaces and/or code that are operable to provide power to the processor 216 for the ultrasonic transducer array 218. For example, the power source 214c may supply or generate electrical impulses such that the ultrasonic transducer array 218 may rapidly create ultrasound beams for transmission.

The processor 216 may comprise suitable logic, circuitry, interfaces and/or code that may be operable to manage, coordinate and/or control operations of associated device component units such as, for example, the communicators 214a and the networking unit 214b, depending on usages. For example, the processor 216 may be operable to activate or deactivate the networking unit 214b on an as needed basis in order to save power. Depending on device capabilities and user preferences, the processor 216 may be operable to determine or select which electronic devices such as the electronic devices 130a-130b within a geographic area of interest are to be wirelessly charged. The processor 216 may coordinate with the beam former circuitry 217 such that the ultrasonic transducer elements 218a-218n of the ultrasonic transducer array 218 in the proximity of the selected electronic devices may be activated to transmit ultrasound power. In this regard, the processor 216 may arrange the activated ultrasonic transducer elements of the ultrasonic transducer array 218 with appropriate time delays or phase delays so that the resulting ultrasounds may be combined to maximize ultrasound power transmission. For example, the processor 216 may be operable to activate the transducer element 218k of the ultrasonic transducer array 218 first and then activate the transducer element 218j after a certain time delay or phase delay. The processor 216 may manage or control the ultrasonic transducer elements 218a-218n to either transmit or receive. In this regard, the processor 216 may be operable to manage or control the beamformer circuitry 217 to operate in a transmit mode or a receive mode, accordingly. For example, the processor 216 may utilize a multiplexer to switch the beamformer circuitry 217 between the transmit mode and the receive mode.

In an embodiment of the invention, the processor 216 may be operable to concentrate ultrasound beams to a geographic area identified with good ultrasound transmission, permeability, and/or magnetic property. In this regard, the processor 216 may signal an electronic device such as the electronic device 130b that needs to be charged to move to the identified geographic area for wireless battery charging. Furthermore, the ultrasound power transmitter 210 may comprise one or more alignment magnets 211a-211d that may be used to align the receive power transducers 222a of the electronic device 220 with the transmit transducer array 218 of the ultrasound power transmitter 210. For example, the ultrasound power receiver 222 may also comprise alignment magnets 221a-221d that may be used to align with the alignment magnets 211a-211d of the ultrasound power transmitter 210. The processor 216 may be operable to instruct the beam former circuitry 217 to adjust ultrasound beams accordingly for the wireless battery charging within the identified geographic area. In an embodiment of the invention, the processor 216 may be operable to utilize ultrasonic signals to enable various Near Field Communication (NFC) applications such as wireless device pairing. Device pairing is a promising technique to generate a common secret between two devices that shared no prior secrets with minimum or without additional hardware. In this regard, the processor 216 may insert or embed device pairing information corresponding to intended electronic devices such as the electronic devices 130b and 130f into ultrasonic signals to be communicated or emitted. The device pairing information may comprise desired applications, device identity identifiers, supported communication protocols, and/or candidates of communication network. Device identity identifiers may comprise various device addresses such as Bluetooth address, MAC address, and/or link keys. The processor 216 may utilize the ultrasonic transducer array 218 to beam or emit the ultrasonic signals with the embedded device pairing information to wirelessly pair the electronic devices 130b and 130f. In this regard, the ultrasound power transmitter 210 may operate as a network router to maintain and secure communication among associated electronic devices.

The beam former circuitry 217 may comprise suitable logic, circuitry, interfaces and/or code that may be operable to steer and focus ultrasound beams to objects of interest. In this regard, the beam former circuitry 217 may be operable to drive or activate a set of the ultrasonic transducers 218a-218n utilizing properly time-delayed electrical impulses. The activated set of the ultrasonic transducers 218a-218n may be utilized to produce ultrasonic beams to be steered and focused on the objects. The process of steering and focusing sound beams in an ultrasound system is commonly referred to as phased array beamforming or beamforming.

The beamformer circuitry 217 may comprise various device components such as Digital to Analog Control (DAC), Analog to Digital Control (ADC) components, amplifiers, and/or gain control. In exemplary embodiments of the invention, the ultrasonic transducer elements 218a-218n of the ultrasonic transducer array 218 may be operable to transmit and receive depending on configuration. In such instances, the beamformer circuitry 217 may be arranged or configured by the processor 216 to operate in a transmit mode or a receive mode, accordingly. For example, a multiplexer may be utilized by the processor 216 to manage the switching of the beamformer circuitry 217 between the transmit mode and the receive mode. In another example, a high voltage pulsar coupled to the beamformer circuitry 217 may be utilized to provide a high energy voltage pulse so as to activate a ultrasonic transducer element such as the ultrasonic transducer elements 218a. In this regard, the beamformer circuitry 217 may be operable to manage or control the transmit or receive operation of the ultrasonic transducer array 218 when each of the ultrasonic transducer elements 218a-218n is activated via a high voltage pulse.

The ultrasonic transducer array 218 may comprise suitable logic, circuitry, interfaces and/or code that may be operable to provide or produce ultrasound waves. In this regard, the ultrasonic transducer array 218 may be operable to transform electrical signals to ultrasonic waves or signals. The ultrasonic transducer array 218 may be arranged to emit or focus the ultrasonic signals to an object. The ultrasonic transducer array 218 may comprise a plurality of ultrasonic transducer 218a-218n. The ultrasonic transducers 218a-218n may be made of piezoelectric crystals, crystals with some unique properties which make them ideal for ultrasound applications. In this regard, the piezoelectric crystals may be excited by predetermined time-delayed signals to generate structural interference patterns. For example, the shape of the piezoelectric crystals may be deformed by an electrical charge. As the piezoelectric crystals change shape, they may emit sound waves. In an exemplary embodiment of the invention, the ultrasonic transducer elements 218a-218n of the ultrasonic transducer array 218 may be operable to transmit and receive depending on configuration. For example, a high voltage pulsar coupled to the beamformer circuitry 217 may be utilized to provide a high energy voltage pulse in order to activate a ultrasonic transducer element such as the ultrasonic transducer elements 218a. In this regard, the transmit or receive operation of the ultrasonic transducer array 218 may be managed or controlled through the beamformer circuitry 217 when each of the ultrasonic transducer elements 218a-218n is activated via a high voltage pulse, for example.

The memory 219 may comprise suitable logic, circuitry, interfaces and/or code that may be operable to store information such as executable instructions and data that may be utilized by the processor 216 and/or other associated component units such as, for example, the Tx ultrasonic transducer array 218 and the beam former circuitry 217. The memory 219 may comprise RAM, ROM, low latency non-volatile memory such as flash memory and/or other suitable electronic data storage.

The electronic device 220 may comprise suitable logic, circuitry, interfaces and/or code that are operable to conduct communications utilizing battery energy. In this regard, the electronic device 220 may be wirelessly charged utilizing ultrasound energy emitted from the ultrasound power transmitter 210. The electronic device 220 comprises an ultrasound power receiver 222, a battery charger 224, a battery 226, electronic device circuitry 228, and a plurality of data communicators 229.

The ultrasound power receiver 222 may comprise a plurality of transducers 222a and a power combiner 222b. The ultrasound power receiver 222 may comprise suitable logic, circuitry, interfaces and/or code that may be operable to receive and decode ultrasound signals for use as sound. The ultrasound power receiver 222 may be fitted on the electronic device 220, for example, in the shape of associated mating materials such as pad and back cover of the electronic device 220. In an embodiment of the invention, a cavity may be created in the associated mating materials of the electronic device 220. Highly conductive material may be added into the created cavity. In this regard, various liquids such as gel, or sensors may be placed in the mating materials of the electronic device 220 to enhance power transfer. The ultrasound power receiver 222 comprises a plurality of receiver (Rx) ultrasonic transducers 222a and a power combiner 222b.

The Rx ultrasonic transducers 222a may comprise suitable logic, circuitry, interfaces and/or code that may be operable to detect or sense ultrasound waves. In this regard, the Rx ultrasonic transducers 222a may be operable to receive ultrasonic signals emitted from the ultrasonic transducer array 218. The ultrasonic transducers 222a may communicate the received ultrasonic signals to the power combiner 222b. In an exemplary embodiment of the invention, the ultrasound power receiver 222 may comprise one or more alignment magnets 221a-221d that may be used to align with the alignment magnets 211a-211d of the ultrasound power transmitter 210 to increase transmission efficiency from the ultrasound power transmitter 210 to the ultrasound power receiver 222. The power combiner 222b may comprise suitable logic, circuitry, interfaces and/or code that may be operable to couple or combine ultrasonic signals received via the Rx ultrasonic transducers 222a. The power combiner 222b may feed or provide the combined ultrasonic signals to the battery charger 224.

The battery charger 224 may comprise suitable logic, circuitry, interfaces and/or code that may be operable to convert the ultrasound energy supplied from the power combiner 222b back into electric power so as to charge the battery 226 for the electronic device 220. For example, the battery charger 224 may take or capture ultrasonic signals and convert the captured ultrasonic signals to a stable dc voltage to charge the battery 226.

The battery 226 may comprise suitable logic, circuitry, interfaces and/or code that may be operable to read or receive electric current flowing into the battery 226. The ultrasound power transmitter 210 may wirelessly charge the battery 226 without using cables or plugging in the electronic device 220.

The electronic device circuitry 228 may comprise suitable logic, circuitry, interfaces and/or code that may be operable to handle various applications supported by the electronic device 220. For example, with the electronic device 220 operating as a cellular telephone, the electronic device circuitry 228 may be configured to handle or place cellular telephone calls through appropriate communicators such as a CDMA radio. In an embodiment of the invention, the device circuitry 228 may be operable to utilize ultrasonic signals emitted from the ultrasound power receiver 222 to support various NFC applications such as wireless device pairing. In this regard, the device circuitry 228 may enable the electronic device 220 to be wirelessly paired to other one or more electronic devices such as a Bluetooth headset utilizing ultrasound signals without utilizing coils.

The data communicators 229 may comprise suitable logic, circuitry, interfaces and/or code that are operable to transmit and/or receive signals for data communication at appropriate frequency bands such as a cellular radio frequency band and a Bluetooth radio band. In this regard, the data communicators 229 may be incorporated with a RF communicator 229a, a magnetic coupling communicator 229b, a mmW RF communicator 229c, and an ultrasound communicator 229d to communicate RF signals, magnetic signals, mmW RF signals and/or ultrasonic signals, respectively.

In an exemplary operation, the ultrasound power transmitter 210 may capture or receive electric power via the communicators 214a from electrical power sources. The power source 214c may supply or generate electrical impulses so as to rapidly create ultrasound beams for ultrasound power transmission. In this regard, the beam former circuitry 217 may be operable to utilize the generated electrical impulses to activate one or more ultrasonic transducers 218a-218n. The activated ultrasonic transducers 218a-218n may steer and focus ultrasound beams on the ultrasound power receiver 222. The ultrasound power receiver 222, which may be fitted in the mating material of the electronic device 220, may utilize the Rx ultrasonic transducers 222a to detect and receive ultrasound signals emitted from the Tx ultrasonic transducer array 218. The received ultrasound signals may be combined and fed to the battery charger 224. The battery charger 224 may convert the ultrasound energy supplied from the power combiner 222b back into electric power to charge the battery 226. The battery 226 may output electric power to the electronic device circuitry 228 and the data communicators 229 to support desired applications running on the electronic device 220.

Figure 3:
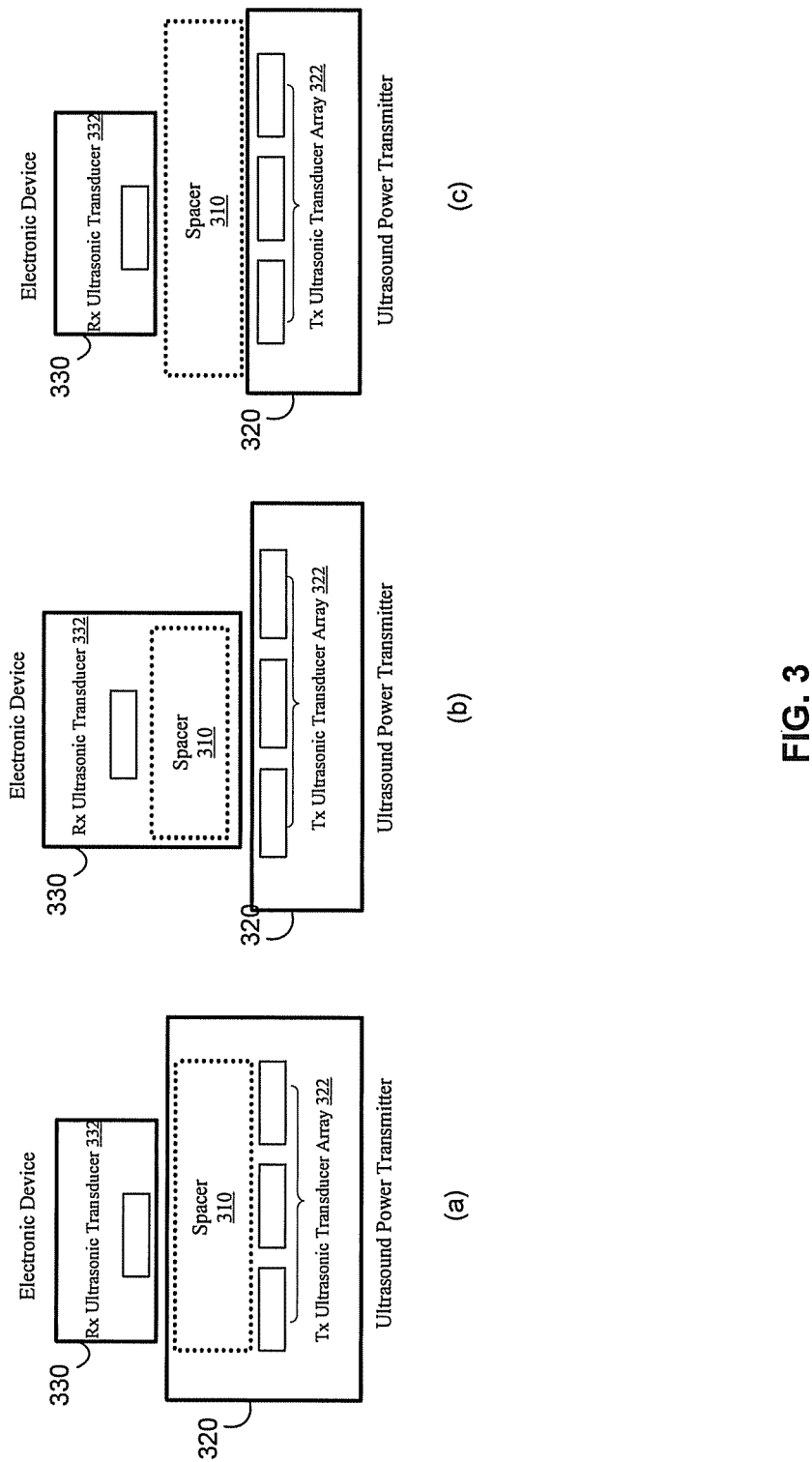
FIG. 3 is a diagram that conceptually illustrates placement of an optional spacer with good ultrasound power transmission properties, in accordance with an embodiment of the invention.

FIG. 3 is a diagram that conceptually illustrates placement of an optional spacer with good ultrasound power transmission properties, in accordance with an embodiment of the invention. As shown, a spacer 310 may be placed between the Tx ultrasonic transducer array 322 in the ultrasound power transmitter 320, and the Rx ultrasonic transducer 332 in the electronic device 330. In this regard, the spacer 310 with good ultrasound power transmission properties may be housed or placed inside the ultrasound power transmitter 320, the electronic device 330, or may be placed between the ultrasound power transmitter 320 and the electronic device 330, as shown in FIGS. 3(a), (b), and (c), respectively. The spacer 310 may be a small-volume spacer that may be compact enough for anyone on the move. The spacer 310 may be composed of flexible low attenuation liquids such as sonolucent gel.

Figure 4:
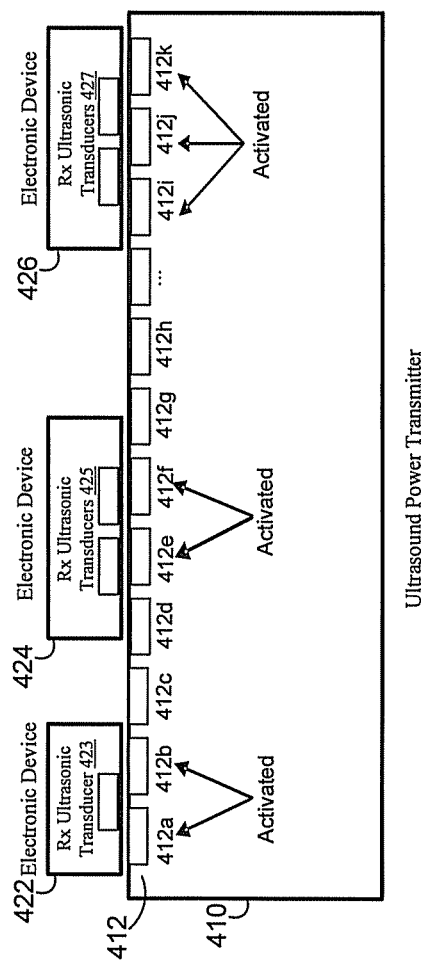
FIG. 4 is a diagram that conceptually illustrates proximity based ultrasound transmit beamforming for wireless battery charging, in accordance with an embodiment of the invention.

FIG. 4 is a diagram that conceptually illustrates proximity based ultrasound transmit beamforming for wireless battery charging, in accordance with an embodiment of the invention. Referring to FIG. 4, there is shown the Tx ultrasonic transducer array 412 in the ultrasound power transmitter 410 may be utilized to emit or provide ultrasonic signals so as to wirelessly power or charge different electronic devices 422, 424 and 426. In an embodiment of the invention, different subsets of Tx ultrasonic transducers of the Tx ultrasonic transducer array 412 may be activated based on corresponding proximity to Rx ultrasonic transducers of the different electronic devices that are being charged. For example, as shown, the electronic device 422 comprises a Rx transducer 423 and is placed in close vicinity of Tx transducers 412a and 412b of the Tx ultrasonic transducer array 412. The electronic device 424 comprises Rx transducers 425 and is in the vicinity of Tx transducers 412e and 412f of the Tx ultrasonic transducer array 412. The electronic device 426 comprises Rx transducers 427 and is in the vicinity of Tx transducers 412i, 412j, and 412k of the Tx ultrasonic transducer array 412. In this regard, the ultrasound power transmitter 410 may activate corresponding Tx transducers close to the electronic devices 422 through 426, respectively. The ultrasound power transmitter 410 may arrange the activated transducers 412a and 412b, the activated transducers 412e and 412f, and the activated transducers 412i, 412j, 412k, to transmit ultrasound power, accordingly. In another embodiment of the invention, the ultrasound power receiver 222 may be operable to provide feedback to the ultrasound power transmitter 210 in order to optimize power transmission from the ultrasound power transmitter 210 to the ultrasound power receiver 222. In particular, the power combiner 222b may combine and sum the received power from the Rx transducers 222a. The resulting sum may then be transmitted back to the ultrasound power transmitter 210. The feedback may occur over the ultrasound channel between the ultrasonic transducer array 218 and the ultrasonic power receiver 222. The feedback may also occur over other communication channels such as, for example, Bluetooth channels, WLAN channels, cellular channels, and/or WiMAX channels, between data communicators 229 and 214a. The ultrasound power transmitter 210 may then change the set of activated transducer elements of the ultrasonic transducer array 218 to increase the power received at the power combiner 222b.

Figure 5:
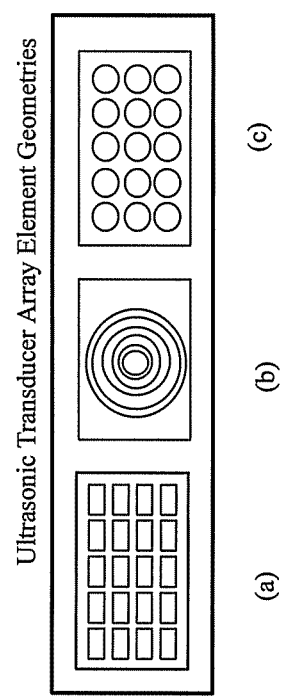
FIG. 5 is a diagram that conceptually illustrates ultrasonic transducer array geometries utilized for wireless battery charging, in accordance with an embodiment of the invention.

FIG. 5 is a diagram that conceptually illustrates ultrasonic transducer array geometries utilized for wireless battery charging, in accordance with an embodiment of the invention. As shown, various ultrasonic transducer array geometries may be utilized by the ultrasound power transmitter 410 to emit or transmit ultrasonic signals wirelessly to power electronic devices 422, 424 and 426. A rectangular array, a ring array, and a circular array, which may be utilized for the Tx ultrasonic transducer array 218, are presented in FIG. 5(a), (b), (c), respectively.

Figure 6:
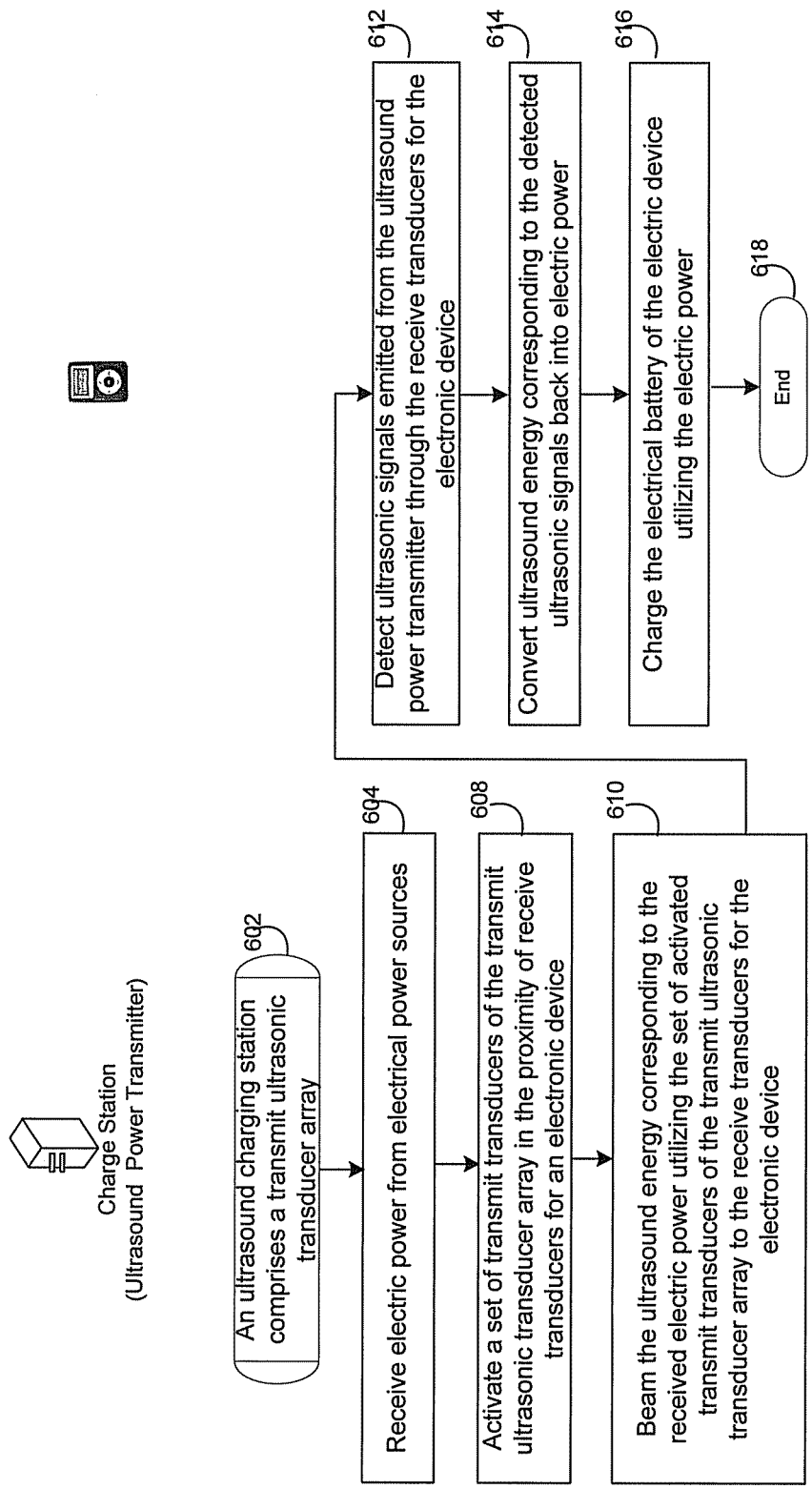
FIG. 6 is a diagram illustrating exemplary steps utilized by an ultrasound charge station to perform proximity based ultrasound battery charging, in accordance with an embodiment of the invention.

FIG. 6 is a diagram illustrating exemplary steps utilized by an ultrasound battery charging station to perform proximity based ultrasound battery charging, in accordance with an embodiment of the invention. Referring to FIG. 6, in step 602, an ultrasound charging station such as the ultrasound power transmitter 210 comprises the Tx ultrasonic transducer array 218. The exemplary steps start with step 604, where the Tx ultrasonic transducer array 218 may receive electric power from electronic power sources such as an electrical wall outlet. In step 608, the processor 216 of the ultrasound power transmitter 210 may be operable to activate a set of transmit transducers of the Tx ultrasonic transducer array 218 in the proximity of receive transducers 222a for the electronic device 220. In step 610, the beam former circuitry 217 may form beams to beam or emit the ultrasound energy corresponding to the received electric power utilizing the activated transmit transducers of the Tx ultrasonic transducer array 218 to the receive transducers 222a for the electronic device 220. In step 612, the electronic device 220 may detect or sense ultrasonic signals emitted from the ultrasound power transmitter 210 through the receive transducers 222a. In step 614, the battery charger 224 of the electronic device 220 may convert ultrasound energy corresponding to the detected ultrasonic signals back into electric power. In step 616, the battery charger 224 may charge the electrical battery 226 utilizing the electric power. The exemplary steps end in step 618.

Figure 7:
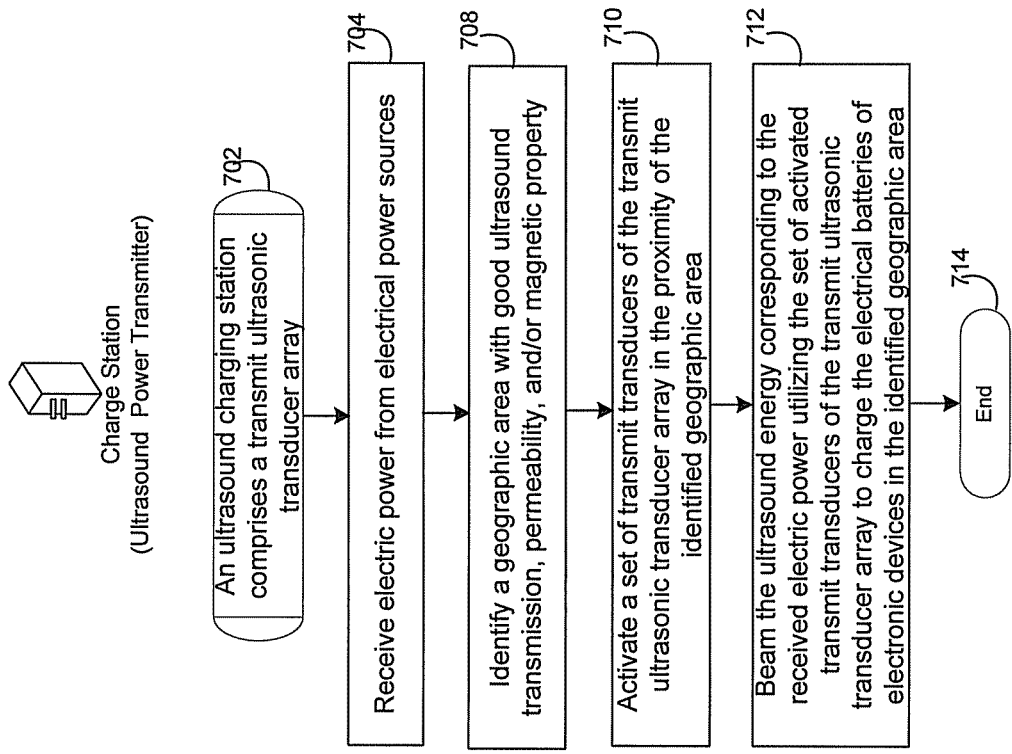
FIG. 7 is a diagram illustrating exemplary steps utilized by an ultrasound charge station to wirelessly charge batteries for electronic devices within a selected geographic area, in accordance with an embodiment of the invention.

FIG. 7 is a diagram illustrating exemplary steps utilized by an ultrasound charge station to wirelessly charge batteries for electronic devices within a selected geographic area, in accordance with an embodiment of the invention. Referring to FIG. 7, in step 702, an ultrasound charging station such as the ultrasound power transmitter 210 comprises the Tx ultrasonic transducer array 218. The exemplary steps start with step 704, where the Tx ultrasonic transducer array 218 may receive or capture electric power from electronic power sources such as an electrical wall outlet. In step 708, the processor 216 of the ultrasound power transmitter 210 may be configured to identify a geographic area with good ultrasound transmission, permeability, and/or magnetic property. In step 710, the processor 216 may be operable to activate a set of transmit transducers, in the proximity of the identified area, of the Tx ultrasonic transducer array 218. In step 712, the beam former circuitry 217 may form beams to beam or emit the ultrasound energy corresponding to the received electric power utilizing the set of activated transmit transducers of the Tx ultrasonic transducer array 218 to electronic devices such as the electronic device 220 within the identified geographic area. The exemplary steps end in step 714.

Figure 8:
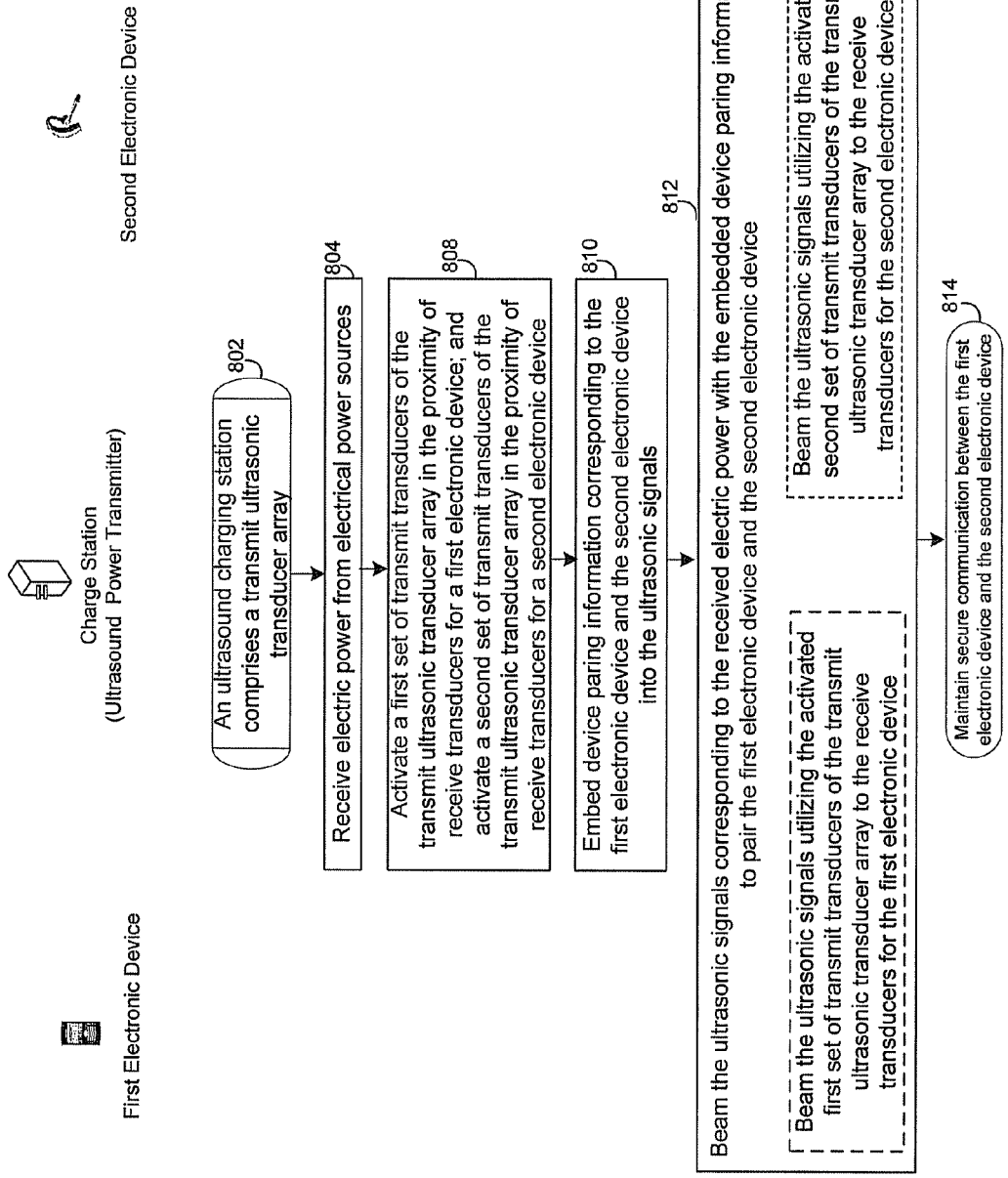
FIG. 8 is a diagram illustrating exemplary steps utilized by an ultrasound charge station to wirelessly pair electronic devices utilizing ultrasonic signals, in accordance with an embodiment of the invention.

FIG. 8 is a diagram illustrating exemplary steps utilized by an ultrasound charge station to wirelessly pair electronic devices utilizing ultrasonic signals, in accordance with an embodiment of the invention. Referring to FIG. 8, in step 802, an ultrasound charging station such as the ultrasound power transmitter 210 comprises the Tx ultrasonic transducer array 218. The exemplary steps start with step 804, where the Tx ultrasonic transducer array 218 may receive electric power from electronic power sources such as an electrical wall outlet. In step 808, the processor 216 of the ultrasound power transmitter 210 may be operable to activate a first set of transmit transducers such as the Tx transducers 412a and 412b, in the proximity of the first electronic device such as the electronic device 130b, of the Tx ultrasonic transducer array 218. The processor 216 of the ultrasound power transmitter 210 may be operable to activate a second set of transmit transducers such as the Tx transducers 412e and 412f, in the proximity of the second electronic device such as the electronic device 130f, of the Tx ultrasonic transducer array 218.

In step 810, the processor 216 of the ultrasound power transmitter 210 may embed device pairing information corresponding to the electronic devices 130b and 130f into the ultrasonic signals. Exemplary device pairing information may comprise desired applications, device identity identifiers, supported communication protocols, and/or candidates of communication network. In step 812, the beam former circuitry 217 may form beams to beam or emit the ultrasonic signals corresponding to the received electric power to pair the electronic devices 130b and 130f. In this regard, the Tx ultrasonic transducer array 218 may be arranged such that the Tx transducers 412a and 412b, activated for the electronic device 130b, may be utilized to beam or emit the ultrasonic signals corresponding to the received electric power to the Rx transducers 222a of the electronic device 130b. The Tx ultrasonic transducer array 218 may be arranged such that the Tx transducers 412e and 412f, activated for the electronic device 130f, may be utilize to beam or emit the ultrasonic signals corresponding to the received electric power to the Rx transducers 222a of the electronic device 130f.

In step 814, in instances where the first electronic device 130b and the second electronic device 130f agree to pair each other, the ultrasound power transmitter 210 may maintain or manage secure communication between the first electronic device 130b and the second electronic device 130f. For example, the ultrasound power transmitter 210 may operate as a network router to relay or communicate content for the desired applications between the two electronic devices 130b and 130f. In another example, the ultrasound power transmitter 210 may transmit or emit, periodically or aperiodically, a code such as password or passkey shared by the two electronic devices 130b and 130f to check and ensure that both users still agree to pair with each other.

Aspects of a method and system for wireless battery charging utilizing ultrasonic transducer array based beamforming are provided. In accordance with various exemplary embodiments of the invention, as described with respect to FIG. 1 through FIG. 8, an ultrasound power transmitter 210 comprising a transmit ultrasonic transducer array 218, which has a plurality of transmit ultrasonic transducers 218a-218n. The ultrasound power transmitter 210 may be operable to activate a set of transmit ultrasonic transducers of the Tx ultrasonic transducer array 218 in close proximity of the ultrasound power receiver 222 associated with the electronic device 220. The activated set of transmit ultrasonic transducers of the Tx ultrasonic transducer array 218 may be utilized to beam ultrasound energy to the ultrasound power receiver 222. The battery charger 224 of the electronic device 224 may convert the ultrasound energy into electric power to charge the battery 226 of the electronic device 220.

In an embodiment of the invention, the ultrasound power transmitter 210 may be operable to identify a specific geographic area with good ultrasound transmission, permeability, and/or magnetic property, for example. In this regard, the ultrasound power transmitter 210 may activate a set of transmit ultrasonic transducers of the Tx ultrasonic transducer array 218 in close proximity of the specific geographic area. The activated set of transmit ultrasonic transducers of the Tx ultrasonic transducer array 218 may be utilized to beam ultrasound energy to the specific geographic area. The electronic device 220 may be moved into the specific geographic area in order to be charged utilizing the ultrasound energy emitted from the ultrasound power transmitter 210. In an embodiment of the invention, the ultrasound power transmitter 210 may be operable to device pair the electronic device 220 with one or more different electronic devices such as the electronic devices 130a-130g utilizing ultrasonic signals. In this regard, the ultrasound power transmitter 210 may embed or insert device pairing information such as desired application, device identity identifiers, and/or communication protocols into the ultrasonic signals.

The ultrasound power transmitter 210 may emit the ultrasonic signals to the electronic device 220 and the electronic devices 130a-130g. Different sets of transmit ultrasonic transducers of the transmit ultrasonic transducer array 218 may be activated based on corresponding proximity of the electronic devices 220 and 130a-130g to beam the ultrasonic signals, accordingly. The transmit ultrasonic transducer array 218 may be realized in various array geometries such as a rectangular array, ring array, or circular array, as shown in FIG. 5(a), (b), (c). As shown in FIG. 3, the spacer 310 may be located or placed between the ultrasound power transmitter 320 and the electronic device 330 to enhance power transmission. In this regard, the spacer 310 with good ultrasound power transmission properties may be housed or placed inside the ultrasound power transmitter 320, the electronic device 330, or between the ultrasound power transmitter 320 and the electronic device 330.

In an embodiment of the invention, the electronic device 220 may provide a feedback to the ultrasound power transmitter 210 in order to increase power transmission efficiency and optimize power transmission from the ultrasound power transmitter 210 to the ultrasound power receiver 222. The feedback may occur over ultrasound channels between the ultrasonic transducer array 218 and the ultrasonic power receiver 222. The feedbacks may also occur over other communication channels such as, for example, Bluetooth channels, WLAN channels, cellular channels, and/or WiMAX channels, between data communicators 229 and 214a. The ultrasound beaming emitted from the ultrasound power transmitter 210 to the electronic device 220 may be managed by aligning one or more alignment magnets of the ultrasound power transmitter 210 with one or more alignment magnets of the electronic device 220.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for wireless battery charging utilizing ultrasonic transducer array based beamforming.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of processing signals, the method comprising:
   in an ultrasound power transmitter device comprising a transmit ultrasonic transducer array having a plurality of transmit ultrasonic transducers:
   activating a set of said plurality of transmit ultrasonic transducers in a proximity of an ultrasound power receiver associated with a first electronic device and an ultrasound power receiver associated with a second electronic device; and
   transmitting via said activated set of said plurality of transmit ultrasonic transducers, ultrasound signals comprising ultrasound energy to said ultrasound power receivers, wherein said ultrasound energy is utilized by each ultrasound power receiver to charge an electrical battery that powers the electronic device associated with the ultrasound power receiver, wherein the ultrasound signals transmitted from the power transmitter device to the first and second devices further comprise device pairing information to pair the first and second electronic devices to establish communication between the first and second electronic devices.

2. The method according to claim 1, wherein said ultrasound power receivers convert said ultrasound energy into electric power to charge said electrical batteries that powers said electronic devices.

3. The method according to claim 1 further comprising:
   activating said set of said plurality of transmit ultrasonic transducers in proximity of a specific geographic area; and
   utilizing said activated set of said plurality of transmit ultrasonic transducers to transmit said ultrasound energy to said specific geographic area, wherein said first and second electronic devices are charged within said specific geographic area utilizing said ultrasound energy.

4. The method according to claim 1, wherein transmitting the ultrasound signals to the ultrasound power receivers comprises transmitting said ultrasonic signals to said first and second electronic devices utilizing different subsets of said set of transmit ultrasonic transducers.

5. The method according to claim 1, wherein feedback is provided by said first and second electronic devices to said ultrasound power transmitter device over an ultrasound channel or other communication channel to increase power transmission efficiency for said ultrasound power transmitter device.

6. The method according to claim 1, wherein said ultrasound power transmitter device comprise one or more alignment magnets that aligns with one or more alignment magnets of said first and second electronic devices for said transmitting.

7. The method according to claim 1, wherein a spacer comprising an ultrasound conductive material is located between said ultrasound power transmitter device and said ultrasound power receiver of the first electronic device.

8. The method according to claim 1, wherein the device pairing information is generated by the ultrasound power transmitter device as a common secret to share by the first and second devices, wherein the first and second devices share no secrets prior to said pairing.

9. The method according to claim 1, wherein the device pairing information comprises at least one of a desired application, a device identity identifier, a supported communication protocol, and a candidate communication network.

10. The method according to claim 1 further comprising the ultrasound power transmitter device acting as a router to relay content between the first and second electronic devices.

11. The method according to claim 1 further comprising the ultrasound power transmitter device transmitting a code to share by the first and second electronic devices to ensure the first and second devices still agree to pair with each other.

12. An ultrasound power transmitter device, comprising:
   one or more processors and circuits; and
   a transmit ultrasonic transducer array having a plurality of transmit ultrasonic transducers, the ultrasound power transmitter device configured to:
   activate a set of said plurality of transmit ultrasonic transducers in a proximity of an ultrasound power receiver associated with a first electronic device and an ultrasound power receiver associated with a second electronic device; and
   transmit, via said activated set of said plurality of transmit ultrasonic transducers, ultrasound signals comprising ultrasound energy to said ultrasound power receivers, wherein said ultrasound energy is utilized by each ultrasound power receiver to charge an electrical battery of the electronic device associated with the ultrasound power receiver, wherein the ultrasound signals transmitted from the power transmitter device to the first and second devices further comprise device pairing information to pair the first and second electronic devices to establish communication between the first device and the second device.

13. The ultrasound power transmitter device according to claim 12, wherein said ultrasound power receivers convert said ultrasound energy into electric power to charge said electrical batteries of said electronic devices.

14. The ultrasound power transmitter device according to claim 12, further configured to:
activate said set of said plurality of transmit ultrasonic transducers in proximity of a specific geographic area; and
utilize said activated set of said plurality of transmit ultrasonic transducers to transmit said ultrasound energy to said specific geographic area, wherein said first and second electronic devices are charged within said specific geographic area utilizing said ultrasound energy.

15. The ultrasound power transmitter device according to claim 12, wherein transmitting the ultrasound signals to the ultrasound power receivers comprises transmitting said ultrasonic signals to said first and second electronic devices utilizing different subsets of said set of transmit ultrasonic transducers.

16. The ultrasound power transmitter device according to claim 12, wherein feedback is provided by said first and second electronic devices to said ultrasound power transmitter device over an ultrasound channel or other communication channel to increase power transmission efficiency for said ultrasound power transmitter device.

17. The ultrasound power transmitter device according to claim 12, wherein said ultrasound power transmitter device further comprises one or more alignment magnets that aligns with one or more alignment magnets of said first and second electronic devices for said transmitting.

18. The ultrasound power transmitter device according to claim 12 further comprising a spacer comprising an ultrasound conductive material located between said ultrasound power transmitter device and said ultrasound power receiver of the first electronic device.

19. The ultrasound power transmitter device according to claim 12, wherein said one or more processors of the ultrasound power transmitter device are configured to generate the device pairing information as a common secret between the first and second devices, wherein the first and second devices share no secrets prior to said pairing.

20. The ultrasound power transmitter device according to claim 12, wherein the device pairing information comprises at least one of a desired application, a device identity identifier, a supported communication protocol, and a candidate communication network.

21. The ultrasound power transmitter device according to claim 12 further configured to act as a router to relay content between the first and second electronic devices.

22. The ultrasound power transmitter device according to claim 19 further configured to transmit a code to share by the first and second electronic devices to ensure the first and second devices still agree to pair with each other.

* * * * *